(12) United States Patent
Shen

(10) Patent No.: US 9,969,521 B2
(45) Date of Patent: May 15, 2018

(54) HELICALLY COLLAPSIBLE BEVERAGE BOTTLE

(71) Applicant: Yang Shen, Emeryville, CA (US)

(72) Inventor: Yang Shen, Emeryville, CA (US)

( * ) Notice: Subject to any disclaimer, the term of this patent is extended or adjusted under 35 U.S.C. 154(b) by 0 days. days.

(21) Appl. No.: 15/583,530

(22) Filed: May 1, 2017

(65) Prior Publication Data
US 2017/0320611 A1 Nov. 9, 2017

Related U.S. Application Data

(60) Provisional application No. 62/333,014, filed on May 6, 2016.

(51) Int. Cl.
| | |
|---|---|
| *B65D 1/02* | (2006.01) |
| *B65D 41/04* | (2006.01) |
| *B65D 23/10* | (2006.01) |
| *A45F 3/16* | (2006.01) |
| *B29C 45/00* | (2006.01) |
| *B29C 51/42* | (2006.01) |
| B29K 83/00 | (2006.01) |
| B29L 31/00 | (2006.01) |

(52) U.S. Cl.
CPC .............. *B65D 1/0292* (2013.01); *A45F 3/16* (2013.01); *B29C 45/0001* (2013.01); *B29C 51/42* (2013.01); *B65D 1/0207* (2013.01); *B65D 1/0246* (2013.01); *B65D 23/104* (2013.01); *B65D 41/04* (2013.01); *B29K 2083/00* (2013.01); *B29L 2031/7158* (2013.01)

(58) Field of Classification Search
CPC ... B65D 1/48; B65D 1/44; B65D 1/42; B65D 1/40; B65D 1/0292; B65D 1/0246; B65D 1/023; B65D 1/0223; B65D 11/18; B65D 41/04; B65D 21/086; B65D 21/08; B65D 23/104; B65D 23/10; B65D 79/005; B65D 1/02; B65D 1/0207; B65D 11/24; B65D 11/20; A45F 3/20; A45F 3/16
USPC ........... 215/44, 43, 329, 316, 381, 382, 900; 220/8, 666, 611, 675, 669, 670, 674; 206/577, 223, 547, 546, 541, 457; 222/107, 104, 95, 92; 446/487; D9/565
See application file for complete search history.

(56) References Cited

U.S. PATENT DOCUMENTS

| | | | | |
|---|---|---|---|---|
| 2,886,084 | A * | 5/1959 | Davison | ................... B65D 1/32 |
| | | | | 220/666 |
| 3,143,429 | A * | 8/1964 | Swanson | ................. A61J 9/005 |
| | | | | 215/11.3 |

(Continued)

*Primary Examiner* — Robert J Hicks
(74) *Attorney, Agent, or Firm* — WHS Law Firm

(57) ABSTRACT

A cylindrical bottle which collapses along helical groove, ridge and connecting rings along its sidewall. When inward force is applied along the bottle's vertical axis, the helical groove rings and connecting rings fold under the ridge rings and remain substantially "locked" under the ridge rings, thereby causing the sidewall to collapse and remain collapsed until sufficient outward force is applied. When sufficient outward force is applied along its vertical axis, the bottle extends as the distance between its helical groove rings and ridge rings lengthens. Due to the diamond-shaped cross-section of the connecting rings, in conjunction with the silicone composition of the bottle's body, the collapsing and extension of the bottle occur in sequential segments, creating a unique, playful sound and an amusing worm-like movement.

8 Claims, 3 Drawing Sheets

(56) References Cited

U.S. PATENT DOCUMENTS 5,209,372 A * 5/1993 Norwood ............. B65D 1/0292
                                                215/11.3
5,573,129 A * 11/1996 Nagata ................. B65D 1/0292
                                                215/382

* cited by examiner

HELICALLY COLLAPSIBLE BEVERAGE BOTTLE

CROSS-REFERENCE TO RELATED APPLICATIONS

This application claims priority to U.S. Provisional Application No. 62/333,014 filed May 6, 2016. The content of the above application is incorporated by reference in its entirety.

FIELD OF THE DISCLOSURE

The disclosure relates to the field of collapsible bottles and containers.

BACKGROUND

This invention relates to an innovative, ergonomically and aesthetically designed, collapsible, reusable bottle. Reusable bottles are directed at the environmental issues and high costs attributable to one-time-use bottles. However, reusable bottles, like current reusable water bottles, are too big to pack or carry. Reusable bottles are designed in a clumsy fashion that makes the bottle difficult to grip, e.g., while drinking. Many existing, collapsible bottles are also uncomfortable to grip because of their bulky or hard ridges, or scales. Reusable bottles current materials—comprised primarily of plastic, glass or aluminum—are problematic as well. The bottles' materials can be expensive, unsafe, difficult to clean and/or not dishwasher-safe. Finally, for their environmental and cost benefits to be realized, consumers must choose reusable bottles over the convenience of one-time-use bottles.

What is needed is a reusable bottle that, due to its engineering and materials, offers a unique helical and collapsible form whereby the bottle easily extends and collapses along its vertical axis for efficient packing and carrying. For ease of use by a drinker, a bottle is needed that is cylindrical with a plush grabbing-surface and—when extended—offers evenly-spaced gripping groove rings that act as finger slots in a natural hand-angle. In this way, a drinker can securely and comfortably hold the bottle. A bottle is needed that uses safe, economical, rugged and easy to clean materials, like silicone and stainless steel. Lastly, a bottle is needed with innovative, attractive features that are aesthetically-pleasing and fun, such as stainless steel elegantly machined into the silicone body, unique playful sounds while collapsing or extending, and a unique segmented, collapsing and extending process that might be compared to a Slinky™ toy.

SUMMARY

The invention is a strong, stable cylindrical container which, upon inward force applied along its vertical axis, reduces its volume by collapsing along helical groove rings and ridge rings along its silicone sidewall. The cylindrical, silicone sidewall is comprised of a plurality of alternating helical groove, ridge and connecting rings (segments). When inward force is applied along the bottle's vertical axis, the helical groove rings and connecting rings fold under the ridge rings and remain substantially "locked" under the ridge rings, thereby causing the sidewall to collapse and remain collapsed until sufficient outward force is applied. When sufficient outward force is applied along its vertical axis, the container's volume is increased by extending along the helical groove rings and ridge rings. The bottle's groove rings are also shaped and helically angled to fit a person's fingers at the natural angle [between about 3° and 23° reflex angle from the axis of the drinker's wrist] of a person who is drinking or holding the bottle. The bottle also comprises a threaded metallic ring, embedded into the bottle's silicone mouth, which allows for safe drinking and washing. Due to the diamond-shaped cross-section of the connecting rings, in conjunction with the silicone composition of the bottle's body, the collapsing and extending of the bottle occur in segments. Collapsing and extending segments creates a unique playful sound and an amusing Slinky™-like action.

BRIEF DESCRIPTION OF THE DRAWINGS

The drawings described herein are for illustrative purposes only and illustrate only selected embodiments of the present invention. The enclosed drawings are not intended to limit the scope of the present disclosure.

DEFINITIONS

Figure 1:
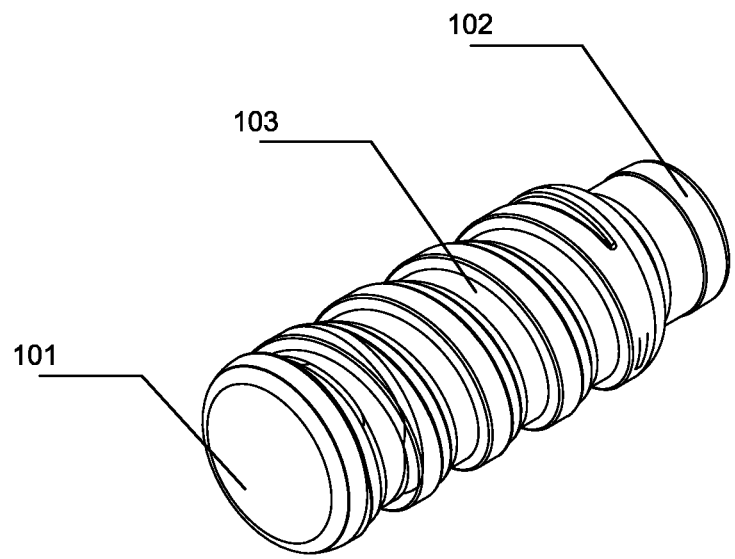
FIG. 1 is a side-rear view of the exterior of the bottle in its extended position.

Collapse, including collapses, collapsing and collapsed: compress, or to be compressed, into a smaller form.

Collapsible: a container's attribute of being able to be collapsed and extended.

Connecting ring: a segment component that is positioned between, or alongside, its corresponding ridge and groove rings.

Extend, including extending and extended: cause to be made into a larger (or longer) form.

Groove ring: a segment component, which is smaller in diameter than its corresponding ridge and container rings, that forms the collapsed bottle's inner wall and the extended bottle's exterior, depressed grooves.

Ridge ring: a segment component, which is larger in diameter than is corresponding groove and container rings, that forms the collapsed bottle's outer wall and the extended bottle's exterior, protruding ridges.

Rim embedment: lower, substantially flange-shaped protrusion of the threaded stainless steel rim.

Segment: a set of three rings (a ridge ring, a connecting ring and a groove ring) that, in combination with other segments, form the body's spirals along the sidewall.

Threaded stainless steel rim: a component of the bottle's mouth that provides for the engagement of a threaded cap.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Any element in a claim that does not explicitly state "means for" performing a specified function, or "step for" performing a specific function is not to be interpreted as a "means" or "step" clause as specified in 35. U.S.C. § 112 ¶6. Specifically, the use of "step of" in the claims herein is not intended to invoke the provisions of U.S.C. § 112 ¶6.

FIG. 1 shows an embodiment of the reusable, collapsible bottle in its extended position with a base 101, a mouth 102 and a substantially spiral-shaped, cylindrical body 103 with helical-shaped sidewalls. The sidewalls, in most embodiments, are comprised of silicone, and form the cylindrical center of the bottle. The sidewalls comprise a plurality of segments (sets of helical ridge, connection and groove rings) integrally joined to comprise the wall. These segments comprise alternating groove rings of lesser diameter, ridge rings of greater diameter and connecting rings of intermediary diameter, which join the groove and ridge rings. When collapsed, said connecting rings and groove rings fold inside said ridge rings to allow the bottle to maintain a strong, stable and collapsed position. When extended, said connecting rings, groove rings and ridge rings are helically-aligned with each other, allowing the bottle to maintain its extended position.

Figure 2:
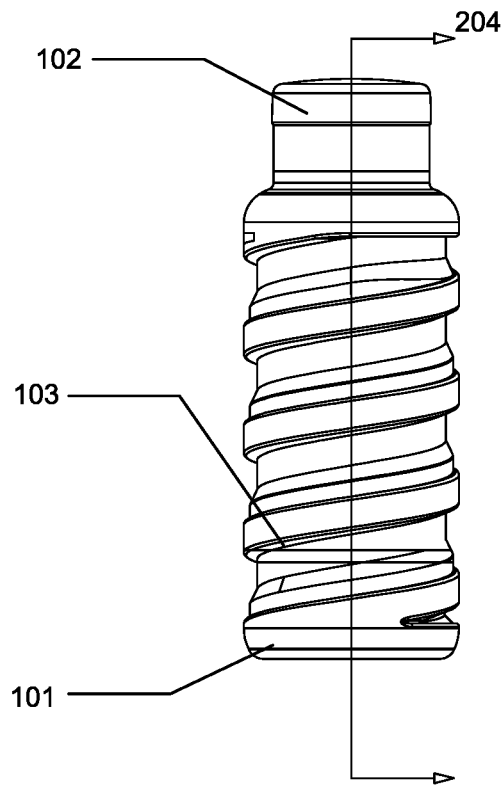
FIG. 2 is a side view of the bottle in its extended position.

FIG. 2 shows the same embodiment as FIG. 1 in an upright position. The bottle collapses along its vertical axis 204 when sufficient positive force, a force towards the center of bottle, is applied at both the bottle's mouth 102 and base 101. Likewise, the bottle extends along its vertical axis 204 when sufficient negative force, a force away from the center of the bottle, is applied at both the bottle's mouth 102 and base 101.

Figure 3:
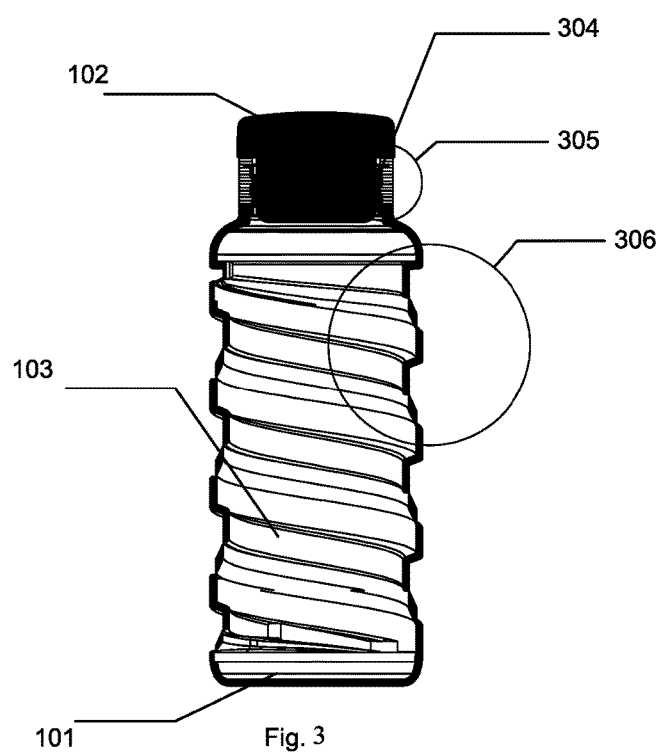
FIG. 3 is a side view of the bottle in its extended position, with additional shading and reference numbers directed to the bottle's mouth.

FIG. 3 shows the same embodiment as FIG. 2 with the bottle's mouth 102 shaded to highlight its internal components. The position of the threaded bottle cap 304 is also shown. The components of the mouth 305 are enumerated in FIG. 4. The components of the bottles sidewall 306 are enumerated in FIG. 5.

Figure 4:
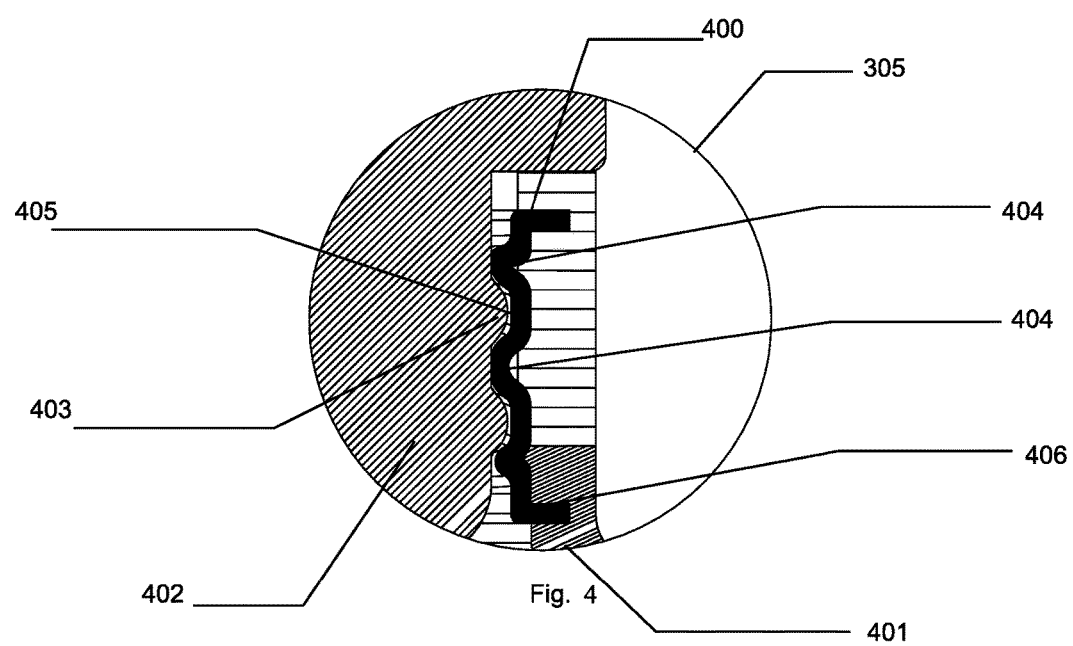
FIG. 4 is a close-up view of the interior of the threaded stainless steel bottle cap and its threaded stainless steel rim.

Referring to FIG. 4, the threaded stainless steel rim 400 is embedded in the bottle's silicone mouth 401. The threaded stainless steel rim 400 is joined with the inner circumference of the mouth 401 during manufacture. The rim embedment 406 protrudes from the lower portion of the threaded stainless steel rim 400 and further secures the rim 400 in the mouth 401. The rim embedment 406 locks the rim 400 in place by fitting the rim's 406 protrusion inside the corresponding, female notch of the bottle's silicone mouth 401.

In the preferred embodiment shown, the threaded stainless steel rim 400, engages the threaded stainless steel bottle cap 402. The rim 400 has thread bulges 404, which as pairs, create thread recesses 405 in said rim 400. The bottle cap 402 likewise has thread bulges 403, which complement and engage said recesses 405 of the threaded stainless steel rim 400.

The threaded stainless steel rim 400 is therefore fixed in the bottle's silicone mouth 401 by its positioning inside said mouth 401 and via the rim embedment 406. When screwed shut, the threaded stainless steel rim 400 has thread bulges 404 and alternating thread recesses 405 that engage the thread bulges 403 of the threaded stainless steel bottle cap 402. Thus, the rim's 400 threading function is comprised of its thread bulges 404 and thread recesses 403 interaction with the bottle cap's 402 thread bulges. As a result, the reusable, collapsible bottle is substantially air-tight, and provides thermal insulation. When fully combined, said rim 400 and said bottle cap 402 function as one virtual piece and a single, stable structure.

The mouth and rim section is manufactured in a novel way. First, the silicone bottle base 103 is formed by injecting liquid silicone into a mold. After the base is cooled and sufficiently firm, silica glue is applied around the circumference of the bottle neck 401. Then, the pre-formed stainless steel ring 400 is applied and embedded onto the bottle neck 401. Then the entire silicone bottle with stainless steel neck ring 400 are put back onto mold and pressed together to be integrated tightly, further supported by the rim embedment portion 406 securely positioned in place.

The silicone bottle with embedded stainless steel ring 400 then undergoes vulcanization and is baked under about 205° C. for about 5 hours. This procedure produces the desired color, shape, texture and firmness. Variations of these parameters or materials causes bottle and rim defects. For example, if plastic, rubber and glass are used instead of the invention's silicon and stainless steel, or if the integrated molding technique, sequence, time blocks and temperatures are not substantially followed, the invention's desirable features will not manifest.

Figure 5:
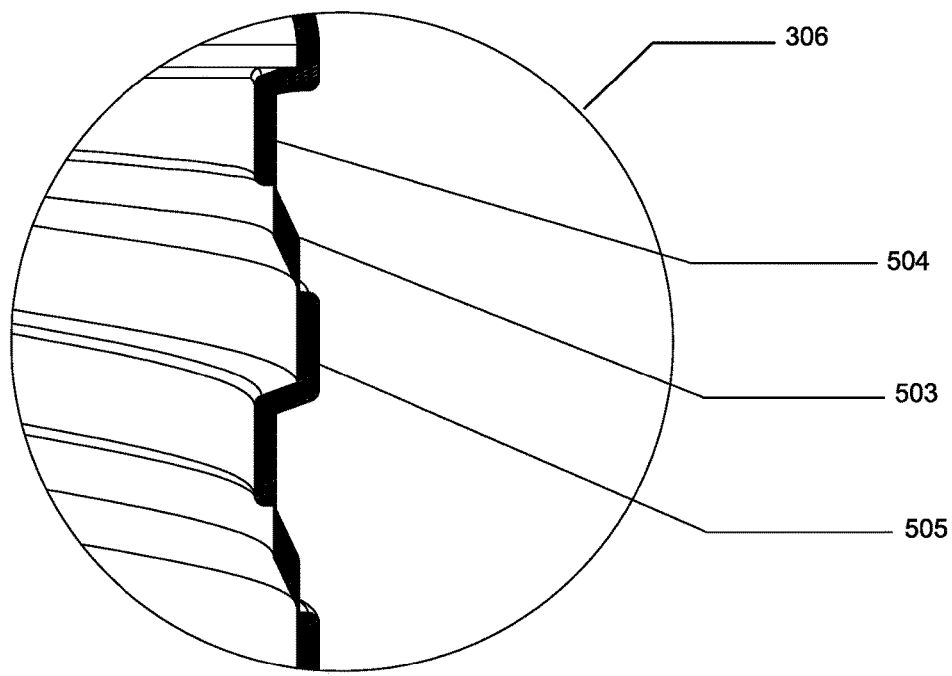
FIG. 5 is a close-up side exterior view of the bottle's body, specifically the groove ring, ridge ring and connecting ring components of the silicone bottle's sidewall.

FIG. 5 is an exploded view of the groove ring 504, ridge ring 505 and connecting ring 503 components of the cylindrical bottle's, helical sidewall 306 in an extended position. When the bottle is in its extended position, the intermediary-diameter connecting rings 503 are positioned along the vertical axis between the corresponding smaller-diameter groove rings 504 and the larger-diameter ridge rings 505. The connecting rings 503 therefore separate the ridge rings 505 from the groove rings 504. The ridge, connecting and groove rings together form both the interior and exterior walls of the bottle.

Further, the helical shape and spacing of the extended bottle's groove rings 504 approximate the angle and form of a hand grip. The groove rings 504 are "finger sized" (dimensions infra) and at a comfortable angle. This allows for an easy, comfortable grip while carrying, pouring or drinking from, the bottle. The groove rings 504 therefore provide for natural holding and carrying when the bottle is in its extended position. To this end, the preferred embodiment of the invention features helical groove rings 504 that are each between about 0.4 cm and about 1.4 cm in height along the bottle's vertical axis.

When the bottle is in its collapsed position, the connecting rings 503 are positioned along the horizontal axis between the corresponding groove rings 504 and ridge rings 505. The ridge rings 505 form the exterior surface of the bottle's sidewall 306. The groove rings 505 form the interior surface of the bottle's sidewall 306. Thus, the ridge rings 505 and groove rings 504 are on either side of the connecting rings 503.

Figure 6:
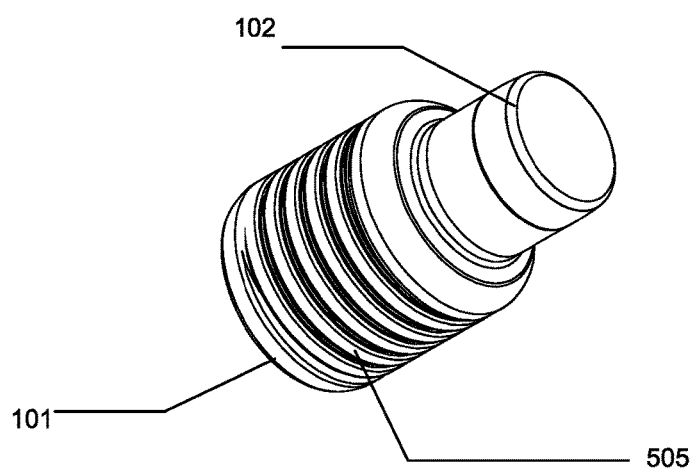
FIG. 6 is an angled, side view of the bottle in its fully collapsed position.

FIG. 6 shows the bottle in its collapsed position. The ridge rings 505 form the external surface of the bottle's sidewall 306.

Referring again to FIG. 5, the connecting ring's 503 structure is important to the collapsing and extending functions discussed below. The cross section of each connecting ring 503 is substantially diamond-shaped. When viewed as a cross-section of the sidewall, the connecting rings 503 have comparatively thinner, internal and external edges as compared to their relatively thicker middle sections. As a result, the connecting rings 503 more easily yield and collapse under pressure, and remain fixed over the groove rings 504 in the bottle's collapsed position.

Referring to FIG. 2, the bottle collapses along its vertical axis 204 when sufficient positive force, a force towards the center of bottle, is applied at both the bottle's mouth 102 and base 101. When the bottle is being collapsed, each groove ring 504 and its corresponding ridge ring 505 overlay each other, with the adjacent connecting ring 503 generating sufficient force to keep the segment fixed in its collapsed position. Due to its diamond-shaped cross section, the width of the connecting ring's 503 middle section is equal to the width of said overlaid rings' interlacing gap. In this way, the overlaid groove ring 504 ring and ridge ring 505 are precisely matched and the corresponding connecting ring 503 is effectively held inside the bottle (when in its collapsed state).

Again, referring to FIG. 2, the bottle extends along its vertical axis 204 when sufficient negative force, a force away from the center of the bottle, is applied at both the bottle's mouth 102 and base 101. Said overlaid groove ring 504 and connecting ring 503 are uncovered to form exterior portions of the bottle's sidewall 306.

An innovative feature of the collapsing and extending functions are their segmentation. The bottle is extended and collapsed one segment at a time (one set of ridge, connection and groove rings at a time). This segmentation provides for attractive features that increase the likelihood a reusable, collapsible bottle will be chosen over a one-time-use bottle. Collapsing and extending the segments creates a unique and entertaining sound like a "burp". Extending the segments also resembles the operation of a Slinky™ toy. As each ridge ring 505 disengages from its corresponding groove ring 504 and connecting ring 503, the bottle opens in segments like a Slinky™ and makes a "burping" sound. The preferred embodiment "burps" upon collapsing at about 340 Hz, with an error margin range of 100 Hz. A wide range of frequencies are available, however, given the composition of the invention's Silicone wall and its varying sizes and diameters. Children, e.g., may be more likely to choose the environmentally friendly and economical bottle.

ALTERNATIVE EMBODIMENTS

A handle, string or hook could be added to the bottle's lid or body for easier carrying.

The same invention modified only in length to serve as a liquid-spraying toy, functioning much like a Hasbro™ Super-Soaker™ water-shooter toy.

The same invention embodied with a relatively smaller mouth and a relatively longer body, to serve as a condiment container to easily squeeze condiments (ketchup, mayonnaise, mustard, etc.) on food. The remaining inventive features, both in silicone body and threaded metallic rim, remain substantially the same.

The invention claimed is:

1. A collapsible bottle comprising an apertured top and a base joined by a cylindrical sidewall, forming a vertical axis between said top and said base;
    said sidewall comprising a plurality of helical segments integrally joined to comprise said sidewall;
    said segments each comprising:
        a groove ring,
        a connecting ring, and
        a ridge ring;
        such that said groove, connecting and ridge rings integrally join to form adjacent portions of said segment;
        wherein said groove ring's diameter is less than said connecting and ridge rings' diameters, said connecting ring's diameter is less than said ridge ring's diameter;
    wherein said connecting ring comprises:
        an upper region adjacent to said groove ring,
        a lower region adjacent to said ridge ring, and
        a middle region;
        wherein said middle region is thicker than said upper and lower regions, thereby giving said connecting ring a substantially diamond-shaped cross-section which effectively locks the said adjacent ridge ring over said adjacent groove ring when so positioned.

2. The collapsible bottle of claim 1, wherein said helical groove rings are each between 0.4 cm and 1.4 cm in height along said vertical axis.

3. The collapsible bottle of claim 1, wherein said helical groove rings are each angled between 3 degrees and 14 degrees from the perpendicular axis across said sidewall.

4. The collapsible bottle of claim 1 wherein said bottle is substantially comprised of vulcanized, molded silicone.

5. The collapsible bottle of claim 1 wherein, when sufficient inward force is applied along said bottle's vertical axis, said connecting rings each sequentially folding underneath its adjoining ridge ring and over its adjoining groove ring, thereby collapsing said bottle in stages by said segments until said bottle is fixed in its fully-collapsed position.

6. The collapsible bottle of claim 5 wherein said collapsing action of folding said connecting rings underneath their adjoining ridge rings and over their adjoining groove rings makes a unique burping sound with a frequency between about 297.6 Hz and 377.6 Hz.

7. The collapsible bottle of claim 1 wherein, when sufficient outward force is applied along said bottle's vertical axis, said connecting rings each sequentially unfold from underneath its adjoining ridge ring and away from over its adjoining groove ring, thereby extending said bottle in stages by said segments until said bottle is fixed in its fully-extended position.

8. The collapsible bottle of claim 7 wherein said extending action includes unfolding said connecting rings from underneath their adjoining ridge rings and away from over their adjoining groove rings in stages by said segments-like movement.

* * * * *